(12) United States Patent
Koo et al.

(10) Patent No.: US 7,602,855 B2
(45) Date of Patent: Oct. 13, 2009

(54) METHOD AND APPARATUS FOR SINGULAR VALUE DECOMPOSITION OF A CHANNEL MATRIX

(75) Inventors: Chang-Soo Koo, Melville, NY (US); Robert Lind Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 608 days.

(21) Appl. No.: 11/392,025

(22) Filed: Mar. 29, 2006

(65) Prior Publication Data

US 2006/0245513 A1    Nov. 2, 2006

Related U.S. Application Data

(60) Provisional application No. 60/667,326, filed on Apr. 1, 2005.

(51) Int. Cl.
H04B 7/02    (2006.01)
(52) U.S. Cl. .................. 375/267; 375/146; 375/260; 375/226; 370/210; 370/480; 708/607; 708/200
(58) Field of Classification Search .............. 375/267, 375/260, 146, 226; 708/607, 200; 370/210, 370/480
See application file for complete search history.

(56) References Cited

U.S. PATENT DOCUMENTS

| | | | |
|---|---|---|---|
| 5,542,101 | A | 7/1996 | Pal |
| 7,327,800 | B2 * | 2/2008 | Oprea et al. ............... 375/267 |
| 2004/0066761 | A1 | 4/2004 | Giannakis et al. |
| 2004/0165684 | A1 | 8/2004 | Ketchum et al. |
| 2004/0192218 | A1 | 9/2004 | Oprea |
| 2004/0252632 | A1 | 12/2004 | Bourdoux et al. |
| 2006/0106902 | A1 * | 5/2006 | Howard et al. ............... 708/200 |
| 2006/0126752 | A1 | 6/2006 | Hansen et al. |
| 2006/0155798 | A1 * | 7/2006 | Ketchum et al. ............ 708/607 |
| 2006/0171297 | A1 * | 8/2006 | Ghosh ........................ 370/210 |

(Continued)

FOREIGN PATENT DOCUMENTS

WO    2006/053340    5/2006

(Continued)

OTHER PUBLICATIONS

Seeger et al., "Advance Eigenbeamforming for the 3GPP UMTS FDD Downlink," ITG IEEE Workshop on Smart Antennas, pp. 1-8 (Apr. 4, 2004).

(Continued)

*Primary Examiner*—Shuwang Liu
*Assistant Examiner*—Eva Puente
(74) *Attorney, Agent, or Firm*—Volpe and Koenig, PC

(57) ABSTRACT

A method and apparatus for decomposing a channel matrix in a wireless communication system are disclosed. A channel matrix H is generated for channels between transmit antennas and receive antennas. A Hermitian matrix $A=H^H H$ or $A=HH^H$ is created. A Jacobi process is cyclically performed on the matrix A to obtain Q and $D_A$ matrixes such that $A=QD_A Q^H$. $D_A$ is a diagonal matrix obtained by singular value decomposition (SVD) on the A matrix. In each Jacobi transformation, real part diagonalization is performed to annihilate real parts of off-diagonal elements of the matrix and imaginary part diagonalization is performed to annihilate imaginary parts of off-diagonal elements of the matrix after the real part diagonalization. U, V and $D_H$ matrixes of H matrix are then calculated from the Q and $D_A$ matrices. $D_H$ is a diagonal matrix comprising singular values of the H matrix.

9 Claims, 2 Drawing Sheets

U.S. PATENT DOCUMENTS

2006/0285531 A1   12/2006   Howard et al.

OTHER PUBLICATIONS

Haykin, Simon "Adaptive Filter Theory", 3rd Edition, Chapter 12.

Michalke et al., "Efficient Tracking of Eigenspaces and its Application to Eigenbeamforming," 14th IEEE Proceedings on Personal, Indoor, and Mobile Radio Communications, vol. 2, pp. 2847-2851 (Sep. 7, 2003).

Schafer et al., "Efficient Tracking of Eigenspaces and its Application to MIMO Systems," Proceedings of the 1st Mobile and Wireless Communications Summit, XP002478514 (Jun. 15, 2003).

* cited by examiner

METHOD AND APPARATUS FOR SINGULAR VALUE DECOMPOSITION OF A CHANNEL MATRIX

CROSS REFERENCE TO RELATED APPLICATION

This application claims the benefit of U.S. Provisional Application No. 60/667,326 filed Apr. 1, 2005, which is incorporated by reference as if fully set forth.

FIELD OF INVENTION

The present invention is related to a wireless communication system. More particularly, the present invention is related to a method and apparatus for singular value decomposition (SVD) of a channel matrix.

BACKGROUND

Orthogonal frequency division multiplexing (OFDM) is a data transmission scheme where data is split into a plurality of smaller streams and each stream is transmitted using a sub-carrier with a smaller bandwidth than the total available transmission bandwidth. The efficiency of OFDM depends on choosing these sub-carriers orthogonal to each other. The sub-carriers do not interfere with each other while each carrying a portion of the total user data.

An OFDM system has advantages over other wireless communication systems. When the user data is split into streams carried by different sub-carriers, the effective data rate on each sub-carrier is much smaller. Therefore, the symbol duration is much larger. A large symbol duration can tolerate larger delay spreads. Thus, it is not affected by multipath as severely. Therefore, OFDM symbols can tolerate delay spreads without complicated receiver designs. However, typical wireless systems need complex channel equalization schemes to combat multipath fading.

Another advantage of OFDM is that the generation of orthogonal sub-carriers at the transmitter and receiver can be done by using inverse fast Fourier transform (IFFT) and fast Fourier transform (FFT) engines. Since the IFFT and FFT implementations are well known, OFDM can be implemented easily and does not require complicated receivers.

Multiple-input multiple-output (MIMO) refers to a type of wireless transmission and reception scheme where both a transmitter and a receiver employ more than one antenna. A MIMO system takes advantage of the spatial diversity or spatial multiplexing and improves signal-to-noise ratio (SNR) and increases throughput.

Generally there are two modes of operation for MIMO systems: an open loop mode and a closed loop mode. The closed loop mode is used when channel state information (CSI) is available to the transmitter and the open loop is used when CSI is not available at the transmitter. In the closed loop mode, CSI is used to create virtually independent channels by decomposing and diagonalizing the channel matrix by pre-coding at the transmitter and further antenna processing at the receiver. The CSI can be obtained at the transmitter either by feedback from the receiver or through exploiting channel reciprocity.

A minimum mean square error (MMSE) receiver for open loop MIMO needs to compute weight vectors for data decoding and the convergence rate of the weight vectors is important. A direct matrix inversion (DMI) technique of correlation matrix converges more rapidly than a least mean square (LMS) or maximum SNR processes. However, the complexity of the DMI process increases exponentially as the matrix size increases. An eigen-beamforming receiver for the closed loop MIMO needs to perform SVD on the channel matrix. The complexity of the SVD processes also increases exponentially as the channel matrix size increases.

SUMMARY

The present invention is related to a method and apparatus for decomposing a channel matrix in a wireless communication system including a transmitter having a plurality of transmit antennas and a receiver having a plurality of receive antennas. A channel matrix H is generated for channels between the transmit antennas and the receive antennas. A Hermitian matrix $A=H^H H$ or $A=HH^H$ is created. A Jacobi process is cyclically performed on the matrix A to obtain Q and $D_A$ matrices such that $A=QD_A Q^H$, where $D_A$ is a diagonal matrix obtained by SVD of the matrix A. In each Jacobi transformation, real part diagonalization is performed to annihilate real parts of off-diagonal elements of the matrix and imaginary part diagonalization is performed to annihilate imaginary parts of off-diagonal elements of the matrix after the real part diagonalization. U, V and $D_H$ matrixes of H matrix, ($D_H$ is a diagonal matrix comprising singular values of the matrix H), is then calculated from the Q and $D_A$ matrices.

DETAILED DESCRIPTION OF THE PREFERRED EMBODIMENTS

The features of the present invention may be incorporated into an integrated circuit (IC) or be configured in a circuit comprising a multitude of interconnecting components.

The present invention provides means for channel estimation, direct inversion of channel correlation matrix in an MMSE receiver and SVD for an eigen beamforming receiver.

Figure 1:
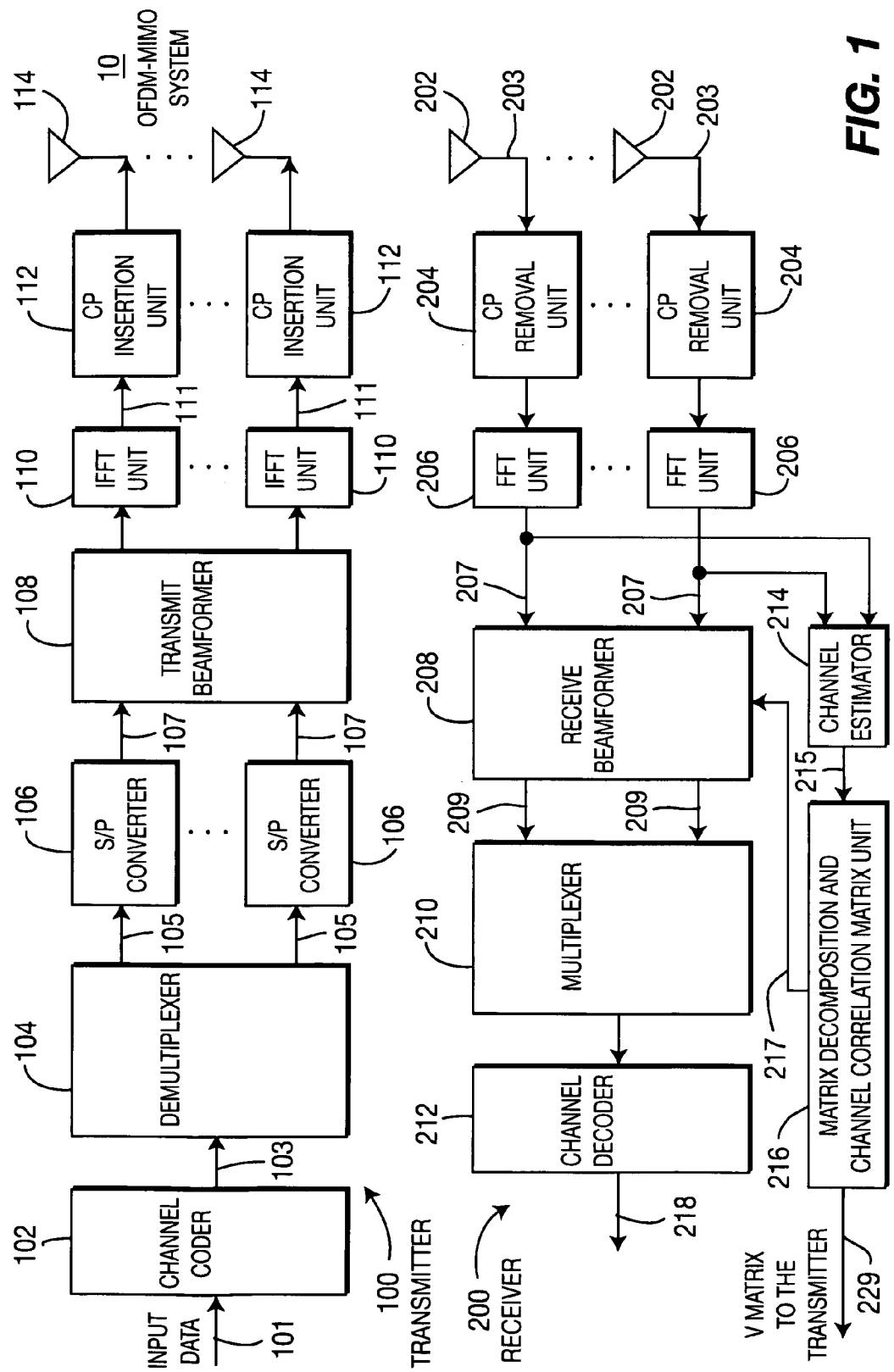
FIG. 1 is a block diagram of an OFDM-MIMO system including a transmitter and a receiver implementing eigen beamforming using SVD in accordance with the present invention.

FIG. 1 is a simplified block diagram of an OFDM-MIMO system 10 including a transmitter 100 and a receiver 200 implementing eigen beamforming using SVD in accordance with the present invention. It should be noted that the system 10 shown in FIG. 1 is provided as an example, not as a limitation, and the present invention is applicable to any wireless communication system needing a matrix decomposition using SVD. The transmitter 100 includes a channel coder 102, a demultiplexer 104, a plurality of serial-to-parallel (S/P) converters 106, a transmit beamformer 108, a plurality of IFFT units 110, cyclic prefix (CP) insertion units 112 and a plurality of transmit antennas 114. The channel coder 102 encodes input data 101 and the encoded data stream 103 is parsed into $N_T$ data streams 105 by the demultiplexer 104. $N_T$ is the number of transmit antennas 114. OFDM processing is performed on each data stream 105. Each data stream 105 is converted into multiple data streams 107 by the S/P converters 106. The data streams 107 are then processed by the transmit beamformer 108. The transmit beamformer 108 performs a transmit precoding with a V matrix decomposed from a channel matrix and sent by the receiver 200 as indicated by arrow 229, which will be explained in detail hereinafter. The IFFT units 110 convert the data into time-domain data streams 111 and a CP is inserted in each data stream 111 by each of the CP insertion units 112 and transmitted through respective ones of the transmit antennas 114.

The receiver 200 includes a plurality of receive antennas 202, CP removal units 204, FFT units 206, a receive beamformer 208, a multiplexer 210, a channel decoder 212, a channel estimator 214 and a matrix decomposition and channel correlation matrix unit 216. The CP is removed from received signals 203 by the CP removal units 204 and processed by the FFT units 206 to be converted to frequency-domain data streams 207. The receive beamformer 208 processes the frequency-domain data streams 207 with U and D matrices 217 decomposed from the channel matrix, which is generated by the matrix decomposition and channel correlation matrix unit 216. Each output 209 of the receive beamformer 208 is then multiplexed by the multiplexer 210 and decoded by the channel decoder 212, which generates a decoded data stream 218. The channel estimator 214 generates a channel matrix 215 preferably from training sequences transmitted by the transmitter 100 via each transmit antenna 114. The matrix decomposition and channel correlation matrix unit 216 decomposes the channel matrix into U, V and D matrices and sends the V matrix 229 to the transmitter 100 and sends the U and D matrices 217 to the receive beamformer 208, which will be explained in detail hereinafter.

The present invention reduces the complexity of both DMI and SVD processes using the characteristics of Hermitian matrix and imaginary part diagonalization. The present invention reduces the complexity significantly over the prior art and, for asymmetric matrices, provides a saving in terms of complexity that is much larger than is provided in the prior art.

The following definition will be used throughout the present invention.

Nt is the number of transmit antennas.

Nr is the number of receive antennas.

s(i) is the i-th (Nt×1) training vector of a subcarrier.

v(i) is the i-th (Nr×1) receive noise vector with v(i)~Nc(0, 1).

y(i) is the i-th (Nr×1) received training vector of a subcarrier.

H is the (Nr×Nt) MIMO channel matrix with $h_{ij}$ representing the complex gain of the channel between the j-th transmit antenna and the i-th receive antenna.

The received signals corresponding to the training symbols are as follows:

$$y(i) = \sqrt{\frac{\rho}{Nt}} Hs(i) + v(i) \quad i = 1, 2, \ldots, T;$$   Equation (1)

for T≧Nt MIMO training symbols. ρ is a total SNR which is independent from the number of transmit antennas.

By denoting Y=[y(1), y(2), ..., y(T)], S=[s(1), s(2), ..., s(T)] and V=[v(1), v(2), ..., v(T)] for a subcarrier, Equation (1) can be rewritten as follows:

$$Y = \sqrt{\frac{\rho}{Nt}} HS + V.$$   Equation (2)

The maximum likelihood estimate of the channel matrix H for a subcarrier is given by:

$$H_{ML} = \arg\min_{H}\min \left\| Y - \sqrt{\frac{\rho}{Nt}} HS \right\|^2$$   Equation (3)

$$= \sqrt{\frac{Nt}{\rho}} YS^H(SS^H)^{-1};$$

where the superscript H represents Hermitian transpose and S is a training symbol sequence. It is assumed that the transmitted training symbols are unitary power, $E\{|s_i|^2\}=1$.

As an alternative to the maximum likelihood channel estimate, linear minimum mean square error (MMSE) channel estimate is given by:

$$H_{MMSE} = \sqrt{\frac{\rho}{Nt}} YS^H\left(\frac{\rho}{Nt}SS^H + I\right)^{-1}.$$   Equation (4)

Since S is known, $SS^H$ can be computed offline. If the training symbol sequence S satisfies $SS^H = T \cdot I_{Nt}$ where $I_{Nt}$ is the Nt×Nt identity matrix, the training symbol sequence S is optimal. For example, according to the HT-LTF pattern for 4 antennas in IEEE 802.11 specification, the training symbol sequence for the subcarrier number (−26), $$S_{-26} = \begin{vmatrix} 1 & 1 & 0 & 0 & 0 & 0 & 0 & 0 \\ 0 & 0 & 0 & 0 & 0 & 0 & 1 & 1 \\ 0 & 0 & 0 & 0 & 1 & 1 & 0 & 0 \\ 0 & 0 & 1 & 1 & 0 & 0 & 0 & 0 \end{vmatrix} \text{ is optimal since}$$

$$S_{-26}S_{-26}^H = 2\begin{vmatrix} 1 & 0 & 0 & 0 \\ 0 & 1 & 0 & 0 \\ 0 & 0 & 1 & 0 \\ 0 & 0 & 0 & 1 \end{vmatrix}.$$

The input-output relationship of a MIMO system can be expressed as follows:

$$y = \sqrt{\frac{\rho}{Nt}} Hs + v;$$   Equation (5)

where $s=[s_1, s_2, \ldots, s_{Nt}]^T$ is the Nt×1 transmit signal vector with $s_i$ belonging to a finite constellation, $v=[v_1, v_2, \ldots, v_{Nr}]^T$ is the Nr×1 receive white Gaussian noise vector. H is the Nt×Nr MIMO channel matrix with $h_{ij}$ representing the complex gain of the channel between the j-th transmit antenna and the i-th receive antenna. Then the data decoding process based on the MMSE is given by:

$$s = \left(\frac{\rho}{Nt}H^H H + I\right)^{-1} H^H y = R^{-1} H^H y = w^H y.$$   Equation (6)

A matrix inversion process for a 2×2 matrix is explained hereinafter.

Direct computation for inverse of 2×2 Hermitian matrix R.

A Hermitian matrix R in Equation (6) and its inverse matrix T are defined as $$R = \begin{vmatrix} R_{11} & R_{12} \\ R_{21} & R_{22} \end{vmatrix} \text{ and } T = R^{-1} = \begin{vmatrix} T_{11} & T_{12} \\ T_{21} & T_{22} \end{vmatrix}.$$

The diagonal elements ($R_{11}$ and $R_{22}$) of the Hermitian matrix R are real and its off-diagonal elements ($R_{12}$ and $R_{21}$) are conjugate symmetric. The inverse matrix T is also Hermitian. Since RT=I where I is a 2×2 identity matrix, the inverse matrix T is obtained by expanding the left-hand side and equating the respective terms with I as follows:

$$T_{11} = \frac{R_{22}}{R_{11}R_{22} - R_{12}R_{12}^H}, \quad \text{Equation (7)}$$
$$T_{12} = -\frac{R_{12}T_{11}}{R_{22}},$$
$$T_{21} = T_{12}^H,$$
$$T_{22} = \frac{1 - R_{21}T_{12}}{R_{22}}.$$

Computing the inverse of 2×2 Hermitian matrix R using Eigenvalue Decomposition.

A Hermitian matrix R in Equation (6) is defined as follows: $R = QDQ^H$ where Q is unitary and D is diagonal.

$$R = \begin{vmatrix} R_{11} & R_{12} \\ R_{21} & R_{22} \end{vmatrix},$$
$$Q = \begin{vmatrix} Q_{11} & Q_{12} \\ Q_{21} & Q_{22} \end{vmatrix},$$
$$D = \begin{vmatrix} D_{11} & 0 \\ 0 & D_{22} \end{vmatrix},$$

where $D_{11}$ and $D_{22}$ are eigenvalues of R.

The eigenvalues $D_{11}$ and $D_{22}$ are computed as follows:

$$D_{11} = \frac{(R_{11} + R_{22}) + \sqrt{(R_{11} + R_{22})^2 - 4(R_{11} + R_{22} - R_{12}R_{12}^*)}}{2}; \quad \text{Equation (8)}$$

$$D_{22} = \frac{(R_{11} + R_{22}) - \sqrt{(R_{11} + R_{22})^2 - 4(R_{11} + R_{22} - R_{12}R_{12}^*)}}{2}. \quad \text{Equation (9)}$$

From RQ=QD, expanding the left-hand and the right-hand sides and equating the respective terms, the following equations are obtained:

$$R_{11}Q_{11} + R_{12}Q_{21} = Q_{11}D_{11}; \quad \text{Equation (10)}$$

$$R_{11}Q_2 + R_{12}Q_{22} = Q_{12}D_{22}; \quad \text{Equation (11)}$$

$$R_{12}^H Q_{11} + R_{22}Q_{21} = Q_{21}D_{11}; \quad \text{Equation (12)}$$

$$R_{12}^H Q_{12} + R_{22}Q_{22} = Q_{22}D_{22}. \quad \text{Equation (13)}$$

From $Q^H Q = I$ where I is the 2×2 identity matrix, expanding the left-hand and the right-hand sides and equating the respective terms, the following equations are obtained:

$$Q_{11}^H Q_{11} + Q_{21}^H Q_{21} = 1; \quad \text{Equation (14)}$$

$$Q_{11}^H Q_{12} + Q_{21}^H Q_{22} = 0; \quad \text{Equation (15)}$$

$$Q_{11}^H Q_{11} + Q_{22}^H Q_{21} = 0; \quad \text{Equation (16)}$$

$$Q_{12}^H Q_{12} + Q_{22}^H Q_{22} = 1. \quad \text{Equation (17)}$$

From Equation (10), $$Q_{21} = \frac{(D_{11} - R_{11})Q_{11}}{R_{12}}. \quad \text{Equation (18)}$$

Substituting Equation (18) to Equation (14), $$Q_{11} = \sqrt{\frac{R_{12}^H R_{12}}{R_{12}^H R_{12} + (D_{11} - R_{11})^2}}. \quad \text{Equation (19)}$$

Substituting Equation (19) to Equation (18), $Q_{21}$ is obtained. From Equation (13), $$Q_{22} = \frac{R_{12}^H Q_{12}}{D_{22} - R_{22}}. \quad \text{Equation (20)}$$

Substituting Equation (20) to Equation (17), $$Q_{12} = \sqrt{\frac{(D_{22} - R_{22})^2}{R_{12}^H R_{12} + (D_{22} - R_{22})^2}}. \quad \text{Equation (21)}$$

Substituting Equation (21) to Equation (20), $Q_{22}$ is obtained. Then the inverse matrix is obtained by:

$$R^{-1} = QD^{-1}Q^H. \quad \text{Equation (22)}$$

Eigen beamforming receiver using SVD, which is shown in FIG. 1, is explained hereinafter. For the eigen beamforming receiver, the channel matrix H for a sub-carrier is decomposed into two beam-forming unitary matrices, U for transmit and V for receive, and a diagonal matrix D by SVD.

$$H = UDV^H; \quad \text{Equation (23)}$$

where U and V are unitary matrices and D is a diagonal matrix. $U \in C^{nR \times nR}$ and $V \in C^{nT \times nT}$. For transmit symbol vector s, the transmit precoding is performed as follows:

$$x = Vs.\qquad\text{Equation (24)}$$

The received signal becomes as follows:

$$y = HVs + n;\qquad\text{Equation (25)}$$

where n is the noise introduced in the channel. The receiver completes the decomposition by using a matched filter as follows:

$$V^H H^H = V^H V D^H U^H = D^H U^H\qquad\text{Equation (26)}$$

After normalizing for channel gain for eigenbeams, the estimate of the transmit symbols s becomes as follws:

$$\begin{aligned}\hat{s} &= \alpha D^H U^H y = \alpha D^H U^H (HVs + n)\\ &= \alpha D^H U^H (UDV^H Vs + n)\\ &= s + \alpha D^H U^H n\\ &= s + \eta.\end{aligned}\qquad\text{Equation (27)}$$

s is detected without having to perform successive interference cancellation of MMSE type detector. $D^H D$ is a diagonal matrix that is formed by eigenvalues of H across the diagonal. Therefore, the normalization factor $\alpha = D^{-2}$. U is a matrix of eigenvectors of $HH^H$, V is a matrix of eigenvectors of $H^H H$ and D is a diagonal matrix of singular values of H (square roots of eigenvalues of $HH^H$).

An SVD process for N×M channel matrix for N>2 and M>2.

The following SVD computation, (Equations (28) through (52)), is based upon cyclic Jacobi process using Givens rotation. The two-sided Jacobi process is explained hereinafter.

Step 1: complex data is converted to real data.

A 2×2 complex matrix is given as follows:

$$A = \begin{vmatrix} a_{ii} & a_{ij}\\ a_{ji} & a_{jj}\end{vmatrix}.\qquad\text{Equation (28)}$$

Step 1-1: $a_{ii}$ is converted to a positive real number $b_{11}$ as follows:

If ($a_{11}$ is equal to zero) then  Equation (29)

$$B = \begin{vmatrix} b_{11} & b_{12}\\ b_{21} & b_{22}\end{vmatrix} = A;$$

else $$B = \begin{vmatrix} b_{11} & b_{12}\\ b_{21} & b_{22}\end{vmatrix} = kA = k\begin{vmatrix} a_{ii} & a_{ij}\\ a_{ji} & a_{jj}\end{vmatrix};\qquad\text{Equation (30)}$$

where $$k = \frac{a_{11}^*}{|a_{11}|} \text{ and } |a_{11}| = \sqrt{\text{real}(a_{11})^2 + \text{imag}(a_{11})^2}.$$

Step 1-2: Triangularization. The matrix B is then converted to a triangular matrix W by multiplying a transformation matrix CSTriangle as follows:

If ($a_{ij}$ or $a_{ji}$ is equal to zero and $a_{jj}$ is equal to zero) then  Equation (31)

$$CSTriangle = \begin{vmatrix} c & s^*\\ -s & c\end{vmatrix} = \begin{vmatrix} 1 & 0\\ 0 & 1\end{vmatrix} \text{ where } c^2 + s^2 = 1.$$

$$W = (CSTriangle)(B) = B;\quad\text{else}\qquad\text{Equation (32)}$$

$$W = (CSTriangle)(B) = \begin{vmatrix} c & s^*\\ -s & c\end{vmatrix}\begin{vmatrix} b_{ii} & b_{ij}\\ b_{ji} & b_{jj}\end{vmatrix} = \begin{vmatrix} w_{ii} & w_{ij}\\ 0 & w_{jj}\end{vmatrix};\qquad\text{Equation (33)}$$

where the cosine parameter c is real, s is complex and $c^2 + |s|^2 = 1$

Then $c = \dfrac{|b_{ii}|}{\sqrt{|b_{ii}|^2 + |b_{ji}|^2}}$ and $s = \dfrac{b_{ji}}{b_{ii}}c.$  Equation (34)

Step 1-3: Phase cancellation. To convert the elements of the triangular matrix W to real numbers, transformation matrices prePhC and postPhC are multiplied to the matrix W as follows:

If ($a_{ij}$ and $a_{jj}$ are equal to zero and $a_{ji}$ is not equal to zero) then $$\begin{aligned}realW &= (prePhC)(W)(postPhC)\\ &= \begin{vmatrix} e^{-j\gamma} & 0\\ 0 & e^{-j\beta}\end{vmatrix}\begin{vmatrix} w_{ii} & 0\\ w_{ji} & 0\end{vmatrix}\begin{vmatrix} 1 & 0\\ 0 & e^{j\beta}\end{vmatrix} = \begin{vmatrix} w_{ii} & 0\\ |w_{ji}| & 0\end{vmatrix};\end{aligned}\qquad\text{Equation (35)}$$

where $\beta = \arg(w_{ji})$ and $\gamma = \arg(w_{ii})$,  Equation (36)

i.e., $e^{-j\beta} = \dfrac{w_{ji}^*}{|w_{ji}|}$, and $e^{-j\gamma} = \dfrac{w_{ii}^*}{|w_{ii}|}$;

else if ($a_{ij}$ is not equal to zero) then  Equation (37)

$$\begin{aligned}realW &= (prePhC)(W)(postPhC)\\ &= \begin{vmatrix} e^{-j\beta} & 0\\ 0 & e^{-j\gamma}\end{vmatrix}\begin{vmatrix} w_{ii} & w_{ji}\\ 0 & w_{jj}\end{vmatrix}\begin{vmatrix} e^{j\beta} & 0\\ 0 & 1\end{vmatrix} = \begin{vmatrix} w_{ii} & |w_{ij}|\\ 0 & |w_{jj}|\end{vmatrix};\end{aligned}$$

where $\beta = \arg(w_{ij})$ and $\gamma = \arg(w_{jj})$,  Equation (38)

i.e., $e^{-j\beta} = \dfrac{w_{ij}^*}{|w_{ij}|}$, and

If ($a_{ij}$ is equal to zero)

$e^{-j\gamma} = 1$;

else $e^{-j\gamma} = \dfrac{w_{jj}^*}{|w_{jj}|}$;  Equation (39)

else $$\begin{aligned}realW &= (prePhC)(W)(postPhC)\\ &= \begin{vmatrix} 1 & 0\\ 0 & 1\end{vmatrix}\begin{vmatrix} w_{ii} & w_{ij}\\ 0 & w_{jj}\end{vmatrix}\begin{vmatrix} 1 & 0\\ 0 & 1\end{vmatrix} = W.\end{aligned}\qquad\text{Equation (40)}$$

Step 2: Symmetrization—a symmetrizing rotation is applied if the matrix realW is not a symmetric matrix. If the matrix realW is symmetric, this step is skipped.

If ($a_{ji}$ is equal to zero and $a_{jj}$ is equal to zero) then $$symW = (symM)^T(realW)$$
$$= \begin{vmatrix} 1 & 0 \\ 0 & 1 \end{vmatrix} realW$$
$$= realW;$$

Equation (41)

else $$symW = (symM)^T(realW)$$
$$= \begin{vmatrix} c & s \\ -s & c \end{vmatrix} \begin{vmatrix} r_{ii} & r_{ij} \\ r_{ji} & r_{jj} \end{vmatrix} \begin{vmatrix} s_{ii} & s_{ij} \\ s_{ji} & s_{jj} \end{vmatrix};$$

Equation (42)

where $s_{ji} = s_{ij}$ and $c^2 + s^2 = 1$.

By expanding the left-hand side and equating terms, $$\rho = \frac{r_{ii} + r_{jj}}{r_{ij} - r_{ji}} = \frac{c}{s}, \quad s = \frac{sign(\rho)}{\sqrt{1+\rho^2}}, \quad c = \rho s.$$

Equation (43)

Step 3: Diagonalization—a diagonalizing rotation is applied to annihilate off-diagonal elements in the matrix symW (or realW).

If ($a_{ij}$ is equal to zero and $a_{jj}$ is equal to zero) then $$D = (diagM)^T(symW)(diagM) = \begin{vmatrix} d_{ii} & 0 \\ 0 & d_{jj} \end{vmatrix},$$

Equation (44)

where $diagM = \begin{vmatrix} 1 & 0 \\ 0 & 1 \end{vmatrix};$ else $$D = (diagM)^T(symW)(diagM)$$
$$= \begin{vmatrix} c & s \\ -s & c \end{vmatrix}^T \begin{vmatrix} s_{ii} & s_{ij} \\ s_{ji} & s_{jj} \end{vmatrix} \begin{vmatrix} c & s \\ -s & c \end{vmatrix}$$
$$= \begin{vmatrix} d_{ii} & 0 \\ 0 & d_{jj} \end{vmatrix};$$

Equation (45)

where $c^2 + s^2 = 1$.

By expanding the left-hand side and equating the respective off-diagonal terms, $$\zeta = \frac{s_{jj} - s_{ii}}{2s_{ji}}, \quad t = \frac{s}{c} \text{ where } t^2 + 2\zeta t - 1 = 0.$$

Equation (46)

For inner rotation, $t = \frac{s}{c} = \frac{sign(\zeta)}{|\zeta| + \sqrt{1+\zeta^2}}$, or Equation (47)

For outer rotation, $t = \frac{s}{c} = -sign(\zeta)(|\zeta| + \sqrt{1+\zeta^2})$.

Equation (48)

Then $c = \frac{1}{\sqrt{1+t^2}}$ and $s = tc$.

Equation (49)

Step 4: Fusion of rotation matrices to generate U and V matrices. U and V matrices are obtained as follows:

$$A = UDV^H.$$

Equation (50)

$$U = [k(diagM)^H(symM)^H(prePhC)(CSTriangle)]^H.$$

Equation (51)

$$V = (postPhC)(diagM).$$

Equation (52)

Cyclic generalized Jacobi process for an M×M square matrix.

In order to annihilate the off-diagonal elements, (i.e., (i,j) and (j,i) elements), of A, the procedures described hereinabove are applied to the M×M matrix A for a total of m=M(M−1)/2 different index pairs in some fixed order. Such a sequence of m transformation is called a sweep. The construction of a sweep may be cyclic by rows or cyclic by columns. In either case, a new matrix A is obtained after each sweep, for which $$off(A) = \sum_{i=1}^{M}\sum_{j=1}^{M} a_{ij}^2 \text{ for } j \neq i$$

is computed. If $off(A) \leq \delta$, the computation stops. $\delta$ is a small number dependent on computational accuracy. Otherwise, the computation is repeated.

Cyclic generalized Jacobi process for an N×M rectangular matrix.

If the dimension N of matrix A is greater than M, a square matrix is generated by appending (N−M) columns of zeros to A. The augmented square matrix B=|A 0|. Then the procedures described hereinabove are applied to B.

$$U^T|A\ 0|\begin{vmatrix} V & 0 \\ 0 & I \end{vmatrix} = diag(\lambda_1, \lambda_2, \ldots, \lambda_M, 0, \ldots 0).$$

Equation (53)

The desired factorization of the original data matrix A is obtained by:

$$U^T AV = diag(\lambda_1, \lambda_2, \ldots, \lambda_M).$$

Equation (54)

If the dimension M of matrix A is greater than N, a square matrix is generated by adding (M−N) rows of zeros to A as follows:

$$B = \begin{vmatrix} A \\ 0 \end{vmatrix}.$$

Equation (55)

Then the procedures described hereinabove are applied to B.

$$\begin{vmatrix} U & 0 \\ 0 & I \end{vmatrix}^T \begin{vmatrix} A \\ 0 \end{vmatrix} V = diag(\lambda_1, \lambda_2, \ldots, \lambda_N, 0, \ldots 0).$$

Equation (56)

The desired factorization of the original data matrix A is obtained by:

$$U^T AV = diag(\lambda_1, \lambda_2, \ldots, \lambda_N).$$

Equation (57)

Figure 2:
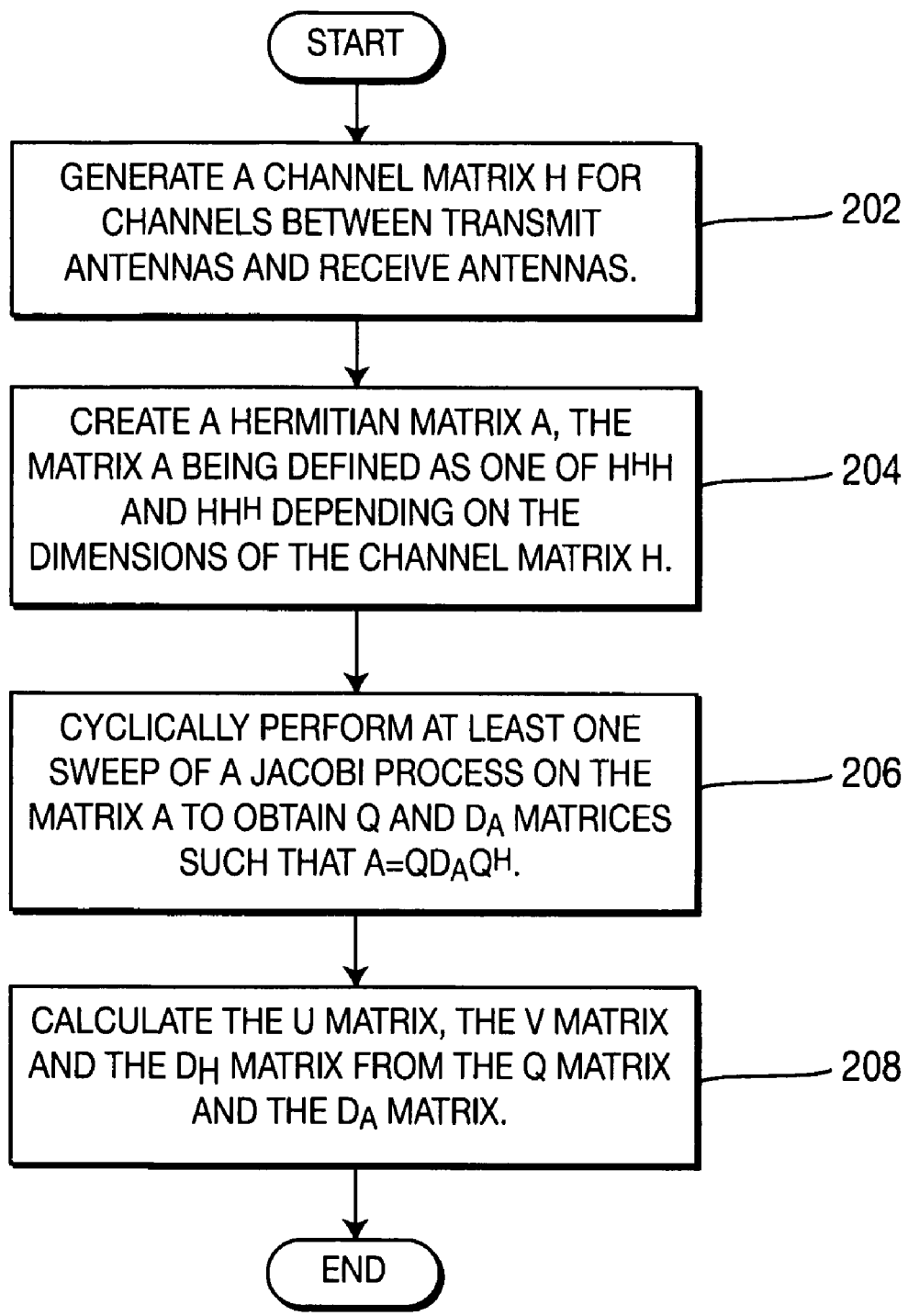
FIG. 2 is a flow diagram of a process for performing an SVD on the channel matrix H in accordance with the present invention.

Hereinafter, the SVD process in accordance with the present invention is explained with reference to FIG. 2. FIG. 2 is a flow diagram of a process for SVD in accordance with the present invention. The present invention provides a method for performing a SVD process. A channel matrix H is created between a plurality of transmit antennas and a plurality of receive antennas (step 202). For the obtained Nr×Nt channel matrix H, a Hermitian matrix A is created (step 204). The matrix A is created as $A=H^H H$ for $Nr \geq Nt$ and as $A=HH^H$ for Nr<Nt. The two-sided Jacobi process is then cyclically applied to the M×M matrix A to obtain Q and $D_A$ matrices such that $A=QD_A Q^H$ where M=min(Nr,Nt), which will be explained hereinafter (step 206). $D_A$ is a diagonal matrix obtained by SVD of the matrix A comprising eigenvalues of the matrix H. Since the matrix A is Hermitian and symmetric, the steps of the prior art for symmetrization is no longer required and the process is greatly simplified. Once SVD of A is computed, the U matrix, the V matrix and the $D_H$ matrix of the H matrix, $(H=UD_H V^H)$, is calculated from the Q matrix and the $D_A$ matrix (step 208).

The step 206 for performing SVD on the A matrix is explained hereinafter. A 2×2 Hermitian matrix symW is defined from the matrix A as follows:

$$symW = \begin{vmatrix} s_{ii} & s_{ij} \\ s_{ji} & s_{jj} \end{vmatrix} = \begin{vmatrix} a_{ii} & a_{ij}+jb_{ij} \\ a_{ji}-jb_{ji} & a_{jj} \end{vmatrix};$$  Equation (58)

where $a_{ii}$, $a_{ij}$, $a_{ji}$, $a_{jj}$, $b_{ij}$ and $b_{ji}$ are real numbers and $a_{ij}=a_{ji}$ and $b_{ij}=b_{ji}$. The matrix symW is generated from the matrix A for each Jacobi transformation as in the prior art mathod.

Real part diagonalization is performed on the matrix symW. Real parts of off-diagonal elements of the matrix symW are annihilated by multiplying transformation matrices $(diagRM)^T$ and diagRM to the matrix symW as follows:

$$D_{real} = (diagRM)^T (symW)(diagRM)$$  Equation (59)

$$= \begin{vmatrix} c & s \\ -s & c \end{vmatrix}^T \begin{vmatrix} s_{ii} & s_{ij} \\ s_{ji} & s_{jj} \end{vmatrix} \begin{vmatrix} c & s \\ -s & c \end{vmatrix}$$

$$= \begin{vmatrix} r_{ii} & jb_{ij} \\ -jb_{ji} & r_{jj} \end{vmatrix};$$

where $r_{ii}$ and $r_{jj}$ are real numbers, $b_{ij}=b_{ji}$ and $c^2+s^2=1$.

By expanding the left-hand side and equating the respective off-diagonal real terms, following equations are obtained.

$$\zeta = \frac{a_{jj}-a_{ii}}{2a_{ji}} \text{ and } t = \frac{s}{c};$$  Equation (60)

where $t^2 + 2\zeta t - 1 = 0$.

For inner rotation, $t = \frac{s}{c} = \frac{\text{sign}(\zeta)}{|\zeta|+\sqrt{1+\zeta^2}}$; or  Equation (61)

For outer rotation, $\cdot t = \frac{s}{c}$  Equation (62)

$= -\text{sign}(\zeta)(|\zeta|+\sqrt{1+\zeta^2})$.

Then, $c = \frac{1}{\sqrt{1+t^2}}$ and $s = tc$.  Equation (63)

Imaginary part diagonalization is then performed. Imaginary parts of off-diagonal elements are annihilated by multiplying transformation matrices $(diagIM)^T$ and diagIM to the matrix obtained by real part diagonalization as follows:

$$D_A = (diagIM)^T (D_{real})(diagIM)$$  Equation (64)

$$= \begin{vmatrix} c & s \\ -js & jc \end{vmatrix}^T \begin{vmatrix} r_{ii} & jb_{ij} \\ -jb_{ji} & r_{jj} \end{vmatrix} \begin{vmatrix} c & s \\ -js & jc \end{vmatrix}$$

$$= \begin{vmatrix} d_{ii} & 0 \\ 0 & d_{jj} \end{vmatrix};$$

where c, s, $r_{ii}$, $r_{jj}$, $b_{ij}$, $b_{ji}$, $d_{ii}$, and $d_{jj}$ are real numbers, $b_{ij}=b_{ji}$, and $c^2+s^2=1$.

By expanding the left-hand side and equating the respective off-diagonal terms, the following equations are obtained.

$$k = 4b_{ij}^2 + (r_{ii}-r_{jj})^2;$$  Equation (65)

$$x = 0.5\left(1+\sqrt{1-\frac{4b_{ij}^2}{k}}\right);$$  Equation (66)

$$c = \sqrt{1-x} \text{ and } s = \sqrt{x};$$  Equation (67)

$$y = cs(r_{ii}-r_{jj}) + (1-2c^2)b_{ij}.$$  Equation (68)

If y>threshold (e.g., =0.0001), then $$x = 0.5\left(1-\sqrt{1-\frac{4b_{ij}^2}{k}}\right);$$  Equation (69)

$$c = \sqrt{1-x} \text{ and } s = \sqrt{x}.$$  Equation (70)

The threshold is some small machine dependent number.

The transformation matrices for the real part diagonalization and the imaginary part diagonalization are then combined to calculate U and V matrices as follows:

$A=UD_A V^H;$  Equation (71)

$U=[(diagIM)^H (diagRM)^H]^H;$  Equation (72)

$V=(diagRM)(diagIM).$  Equation (73)

In order to annihilate the off-diagonal elements, (i.e., (i,j) and (j,i) elements), of A, the foregoing procedures are applied to the M×M matrix A where M=min(Nr, Nt) for a total of m=M(M−1)/2 different index pairs in some fixed order. A new matrix A is obtained after each step, for which $$\text{off}(A) = \sum_{i=1}^{M}\sum_{j=1}^{M} a_{ij}^2 \text{ for } j \neq i$$

is computed. If off(A)$\leq \delta$, where $\delta$ is some small machine dependent number, the computation stops. Otherwise, the computation is repeated.

Once the SVD of the matrix A is completed, the U matrix, the V matrix and the $D_H$ matrix of the H matrix are calculated from the Q matrix and the $D_A$ matrix at step 208 as follows:

From Equations (72) and (73), U=V and A matrix can be written as: $A=QD_A Q^H$. When $Nr \geq Nt$, since Q is equal to V, for $H=UD_H V^H$ and $D_A = Q^H A Q = Q^H H^H H Q = Q^H V D_H U^H U D_H V^H Q = D_H U^H U D_H =$ $D_H D_H$, the $D_A=D_H D_H$, (i.e., $D_H=\text{sqrt}(D_A)$). Then, U, V and $D_H$ matrices are obtained as follows: $U=HV(D_H)^{-1}$ where $V=Q$ and $D_H=\text{sqrt}(D_A)$.

When Nt>Nr, since Q is equal to U, for $H=UD_H V^H$ and $D_A=Q^H AQ=Q^H HH^H Q=Q^H UD_H V^H VD_H U^H Q=D_H V^H VD_H=D_H D_H$, $D_A=D_H D_H$, (i.e., $D_H=\text{sqrt}(D_A)$). Then, U, V and $D_H$ matrices are obtained as follows: $V=H^H U(D_H)^{-1}$ where $U=Q$ and $D_H=\text{sqrt}(D_A)$.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of decomposing a channel matrix H into a U matrix, a V matrix and a $D_H$ matrix whereby $H=UD_H V^H$ using a singular value decomposition (SVD), $D_H$ being a diagonal matrix including singular values of the matrix H, and the superscript H denoting a Hermitian transpose, the method comprising:

generating a channel matrix H for channels between a plurality of transmit antennas of a transmitter and a plurality of receive antennas of a receiver;

creating a Hermitian matrix A, the matrix A being defined as one of $H^H H$ and $HH^H$, depending on the dimensions of the channel matrix H;

cyclically performing at least one sweep of a Jacobi process on the matrix A to obtain Q and $D_A$ matrices whereby $A=QD_A Q^H$, $D_A$ being a diagonal matrix obtained by SVD on the matrix A; and calculating the U matrix, the V matrix and the $D_H$ matrix from the Q matrix and the $D_A$ matrix.

2. The method of claim 1 wherein the cyclically performing step further comprises:

selecting a 2×2 matrix $$symW = \begin{vmatrix} a_{ii} & a_{ij} \\ a_{ji} & a_{jj} \end{vmatrix}$$

from the matrix A for Jacobi transformation;

performing real part diagonalization to annihilate real parts of off-diagonal elements of the matrix symW;

performing imaginary part diagonalization to annihilate imaginary parts of the off-diagonal elements of the matrix symW after the real part diagonalization to generate the diagonal matrix $D_A$; and combining transformation matrices for the real part diagonalization and imaginary part diagonalization to calculate the Q matrix.

3. The method of claim 2 further comprising:

at each sweep of the Jacobi process, calculating a square sum of off-diagonal elements of a matrix obtained at each sweep of the Jacobi process;

comparing the square sum with a threshold; and performing a next step of Jacobi transformation only if the square sum is greater than the threshold.

4. The method of claim 3 wherein the threshold is a machine dependent small number.

5. An apparatus for decomposing a channel matrix H into a U matrix, a V matrix and a $D_H$ matrix whereby $H=UD_H V^H$ using a singular value decomposition (SVD), $D_H$ being a diagonal matrix including singular values of the matrix H, and the superscript H denoting a Hermitian transpose, the apparatus comprising:

a channel estimator configured to generate a channel matrix H for channels between a plurality of transmit antennas of a transmitter and a plurality of receive antennas of a receiver; and a matrix decomposition and channel correlation matrix unit configured to:

create a Hermitian matrix A, the matrix A being defined as one of $H^H H$ and $H^H H$, depending on the dimensions of the channel matrix H, cyclically perform at least one sweep of a Jacobi process on the matrix A to obtain Q and $D_A$ matrices whereby $A=QD_A Q^H$, $D_A$ being a diagonal matrix obtained by SVD on the A matrix, and calculate the U matrix, the V matrix and the $D_H$ matrix from the Q matrix and the $D_A$ matrix.

6. The apparatus of claim 5 wherein the matrix decomposition and channel correlation matrix unit is further configured to:

during each Jacobi transformation of one sweep the matrix decomposition and channel correlation matrix unit, select a 2×2 matrix $$symW = \begin{vmatrix} a_{ii} & a_{ij} \\ a_{ji} & a_{jj} \end{vmatrix}$$

from the matrix A for Jacobi transformation, perform real part diagonalization to annihilate real parts of off-diagonal elements of the matrix symW, perform imaginary part diagonalization to annihilate imaginary parts of off-diagonal elements of the matrix symW after the real part diagonalization to generate a diagonal matrix $D_A$, and combine transformation matrices for the real part diagonalization and imaginary part diagonalization to calculate the Q matrix.

7. The apparatus of claim 6 wherein the matrix decomposition and channel correlation matrix unit, at each sweep of the Jacobi process, is configured to calculate a square sum of off-diagonal elements of a matrix obtained at each sweep of the Jacobi process, compare the square sum with a threshold and perform a next step of Jacobi transformation only if the square sum is greater than the threshold.

8. The apparatus of claim 7 wherein the threshold is a machine dependent small number.

9. An integrated circuit (IC) for decomposing a channel matrix H into a U matrix, a V matrix and a $D_H$ matrix whereby $H=UD_H V^H$ using a singular value decomposition (SVD), $D_H$ being a diagonal matrix including singular values of the matrix H, and the superscript H denoting a Hermitian transpose, the IC comprising:

a channel estimator configured to generate a channel matrix H for channels between a plurality of transmit antennas of a transmitter and a plurality of receive antennas of a receiver; and a matrix decomposition and channel correlation matrix unit configured to:

create a Hermitian matrix A, the matrix A being defined as one of $H^H H$ and $HH^H$, depending on the dimensions of the channel matrix H, cyclically perform at least one sweep of a Jacobi process on the matrix A to obtain Q and $D_A$ matrices whereby $A=QD_A Q^H$, $D_A$ being a diagonal matrix obtained by SVD on the A matrix, and calculate the U matrix, the V matrix and the $D_H$ matrix from the Q matrix and the $D_A$ matrix.

* * * * *

UNITED STATES PATENT AND TRADEMARK OFFICE
CERTIFICATE OF CORRECTION

PATENT NO. : 7,602,855 B2  Page 1 of 1
APPLICATION NO. : 11/392025
DATED : October 13, 2009
INVENTOR(S) : Koo et al.

It is certified that error appears in the above-identified patent and that said Letters Patent is hereby corrected as shown below:

IN THE SPECIFICATION

At column 5, delete Equation (11) and insert therefor --$R_{11}Q_{12} + R_{12}Q_{22} = Q_{12}D_{22}$;--.

At column 8, delete Equation (38) and insert therefor

--$\text{realW} = (\text{prePhC})(W)(\text{postPhC}) = \begin{vmatrix} e^{-j\beta} & 0 \\ 0 & e^{-j\gamma} \end{vmatrix} \begin{vmatrix} w_{ii} & w_{ij} \\ 0 & w_{jj} \end{vmatrix} \begin{vmatrix} e^{j\beta} & 0 \\ 0 & 1 \end{vmatrix} = \begin{vmatrix} w_{ii} & |w_{ij}| \\ 0 & |w_{jj}| \end{vmatrix}$; --.

At column 8, delete line 53 and insert therefor --If ($a_{ij}$ is equal to zero)--.

At column 9, delete Equation (42) and insert therefor

--$\text{symW} = (\text{symM})^T(\text{realW}) = \begin{vmatrix} c & s \\ -s & c \end{vmatrix}^T \begin{vmatrix} r_{ii} & r_{ij} \\ r_{ji} & r_{jj} \end{vmatrix} = \begin{vmatrix} s_{ii} & s_{ij} \\ s_{ji} & s_{jj} \end{vmatrix}$; --.

IN THE CLAIMS

At claim 1, column 13, line 26, after "$H^H H$" delete "and" and insert therefor --or--.

At claim 5, column 14, line 8, after "$H^H H$" delete "and" and insert therefor --or--.

At claim 9, column 14, line 58, after "$H^H H$" delete "and" and insert therefor --or--.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,602,855 B2 Page 1 of 1
APPLICATION NO. : 11/392025
DATED : October 13, 2009
INVENTOR(S) : Koo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this

Fifth Day of October, 2010

David J. Kappos
*Director of the United States Patent and Trademark Office*